United States Patent
Huennekens et al.

(10) Patent No.: US 7,383,224 B2
(45) Date of Patent: Jun. 3, 2008

(54) SYSTEMS AND METHODS FOR PROCESSING CREDIT CARD TRANSACTIONS THAT EXCEED A CREDIT LIMIT

(75) Inventors: Kevin Huennekens, Arlington, VA (US); Haicheng Li, Stanford, CA (US); Martin Poteralski, Glen Allen, VA (US); Jeffrey Marshall, Richmond, VA (US); Marc Solomon, Washington, DC (US)

(73) Assignee: Capital One Financial Corporation, Falls Church, VA (US)

( * ) Notice: Subject to any disclaimer, the term of this patent is extended or adjusted under 35 U.S.C. 154(b) by 1345 days.

(21) Appl. No.: 09/897,775

(22) Filed: Jun. 29, 2001

(65) Prior Publication Data

US 2003/0004866 A1    Jan. 2, 2003

(51) Int. Cl.
*G06Q 40/00*    (2006.01)

(52) U.S. Cl. .............................. 705/39; 705/38; 705/35

(58) Field of Classification Search .................. 705/38, 705/39, 35
See application file for complete search history.

(56) References Cited

U.S. PATENT DOCUMENTS 6,456,984 B1 *  9/2002  Demoff et al. ................ 705/40
6,535,855 B1 *  3/2003  Cahill et al. .................. 705/1

OTHER PUBLICATIONS

Patent Examiner Affidavit, signed on Oct. 2, 2006.*

* cited by examiner

*Primary Examiner*—James P. Trammell
*Assistant Examiner*—Kirsten Apple
(74) *Attorney, Agent, or Firm*—Finnegan, Henderson, Farabow, Garrett & Dunner, LLP

(57) ABSTRACT

A method, system, and computer are disclosed for managing a financial transaction associated with a financial account, wherein the transaction would cause an outstanding balance of the financial account to exceed a credit limit. The method comprises determining a merchant type for a merchant which is a party to the transaction. A merchant credit risk associated with the determined merchant type is determined. The merchant credit risk is compared to a threshold value defining an acceptable credit risk. The transaction is approved based on the comparison of the merchant credit risk with the threshold value.

6 Claims, 4 Drawing Sheets

SYSTEMS AND METHODS FOR PROCESSING CREDIT CARD TRANSACTIONS THAT EXCEED A CREDIT LIMIT

BACKGROUND OF THE INVENTION

1. Field of the Invention

The present invention generally relates to systems and methods for processing credit card transactions, and, more particularly, to systems and methods for processing credit card transactions that exceed a credit limit associated with the credit card.

2. The Related Art

A credit card is a financial product that is most commonly represented by a plastic card-like member. Credit cards are generally issued by a bank and provide a mechanism by which an authorized cardholder purchases products (e.g., goods or services) without an immediate, direct exchange of cash. With each purchase, a cardholder thereby incurs debt which he or she may thereafter (i.e., upon receipt of a monthly or otherwise periodic statement) fully pay the outstanding balance. Alternatively, the cardholder may, as a matter of necessity or choice, defer at least a portion of the balance for later payment with accompanying interest or finance charges for the period during which payment of the outstanding debt is deferred.

The spending power (i.e., the total amount of funds available to the cardholder at any particular time for making purchases and the like) of a credit card is typically limited to a particular amount (the "credit limit") predetermined by the issuer of the card. The size of the issuer-imposed credit limit is generally based on a number of nonexclusive factors, the most important of which are often the cardholder's earning capacity and credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance," while the remaining or available balance of the credit limit is typically called the "available balance" and reflects the dynamically adjusted current spending power of the credit card. The cardholder may increase the available balance, up to the credit limit, by paying to the issuer (or its representative) the entire outstanding balance or a fractional portion thereof.

Under most known credit card administration methods, the card issuer informs the cardholder of the credit limit associated with the credit card. In this way, the credit limit acts as a threshold above which the card issuer will not normally allow purchases by the cardholder. A cardholder may sometimes circumvent the credit limit by applying for a higher credit limit or by requesting and obtaining express authorization from the card issuer to make an emergency purchase above the credit limit. Both of these options are granted only at the discretion of the card issuer, generally on a case-by-case basis.

In a typical credit card administration scheme, transactions are approved via the interaction of a point-of-sale terminal and a central data processor. When a merchant attempts to debit a credit card account, the merchant's point-of-sale terminal sends an electronic message to the central data processor. The central data processor determines whether the potential transaction, if accepted, would cause the outstanding balance to exceed the credit limit. In other words, the central data processor determines whether the potential transaction is of a greater monetary value than the available balance. The central data processor also determines if the card issuer has placed some sort of hold or other block on further transactions. Additionally, the central data processor may also execute some anti-fraud algorithms to determine patterns of suspect buying behavior (e.g., those patterns indicating theft or fraud). If all of these tests are passed, then the central data processor may issue an approval to the point-of-sale terminal. The merchant then completes the transaction.

As mentioned above, the increases in the credit limit and the authorizations to exceed the credit limit typically require the cardholder to contact the card issuer to request an increased credit limit. Oftentimes, however, the cardholder does not realize that a credit limit increase is needed for a particular transaction or is simply unable to contact the card issuer prior to the transaction. Thus, there is a need for a process allowing a card issuer to review transactions that will exceed a credit limit to determine whether a transaction approval is warranted for a particular transaction. Moreover, there is a need for card issuers to make this determination at the time of he transaction.

SUMMARY OF THE INVENTION

Systems and methods consistent with the present invention allow an issuer of a financial account to monitor transactions to determine whether to approve a particular transaction that would otherwise be denied for exceeding the account's credit limit. Moreover, systems and methods consistent with the present invention allow the issuer of the financial account to make the approval determination at the time of the transaction.

In accordance with the invention, a method, system, and computer are disclosed for managing a financial transaction associated with a financial account, wherein the transaction would cause an outstanding balance of the financial account to exceed a credit limit. The method comprises determining a merchant type for a merchant which is a party to the transaction. A merchant credit risk associated with the determined merchant type is determined. The merchant credit risk is compared to a threshold value defining an acceptable credit risk. The transaction is approved based on the comparison of the merchant credit risk with the threshold value.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention.

In the Drawings.

System and methods consistent with the present invention allow an issuer of a credit card account to dynamically approve transactions that would otherwise be denied for exceeding a credit limit associated with the account. To this end, the system monitors each transaction to determine whether that transaction would exceed or cause the outstanding balance to exceed the credit limit. If so, the system heuristically analyzes the type of merchant associated with the transaction to determine whether predetermined criteria is satisfied for approving that transaction. For example, the system may determine that certain types of merchants are associated with a low credit risk, and therefore transactions with those merchants. For some transactions, the system may also heuristically analyze the product purchased by the customer to determine whether to approve the transaction.

While the preferred embodiment is described with respect to credit card accounts, systems consistent with the present invention may be used with other types of financial accounts offering a line of credit (e.g., a home equity line of credit) or with any other type of financial product (e.g., checking accounts, savings accounts, money market accounts, brokerage accounts). For instance, the account may not have an actual "card" associated with it and may be used, for example, for telephonic or Internet purchase transactions. Moreover, the credit limit may or may not be known by or otherwise disclosed to the account holder.

In either case, the card issuer must track a cardholder's use of the credit card to ensure that the cardholder has not spent beyond his or her ability to pay the outstanding balance. In the case of a credit card account with no stated credit limit, this tracking is facilitated by the establishment of a balance bogey. The balance bogey corresponds to a warning level of outstanding balance in monetary terms above which further debits are rejected except in prespecified circumstances. In the case of a traditional credit card with a stated credit limit, the tracking is facilitated by the credit limit. For purposes of the present invention, a balance bogey may be used in an analogous fashion to a credit limit in administering a credit card transaction.

Figure 1:
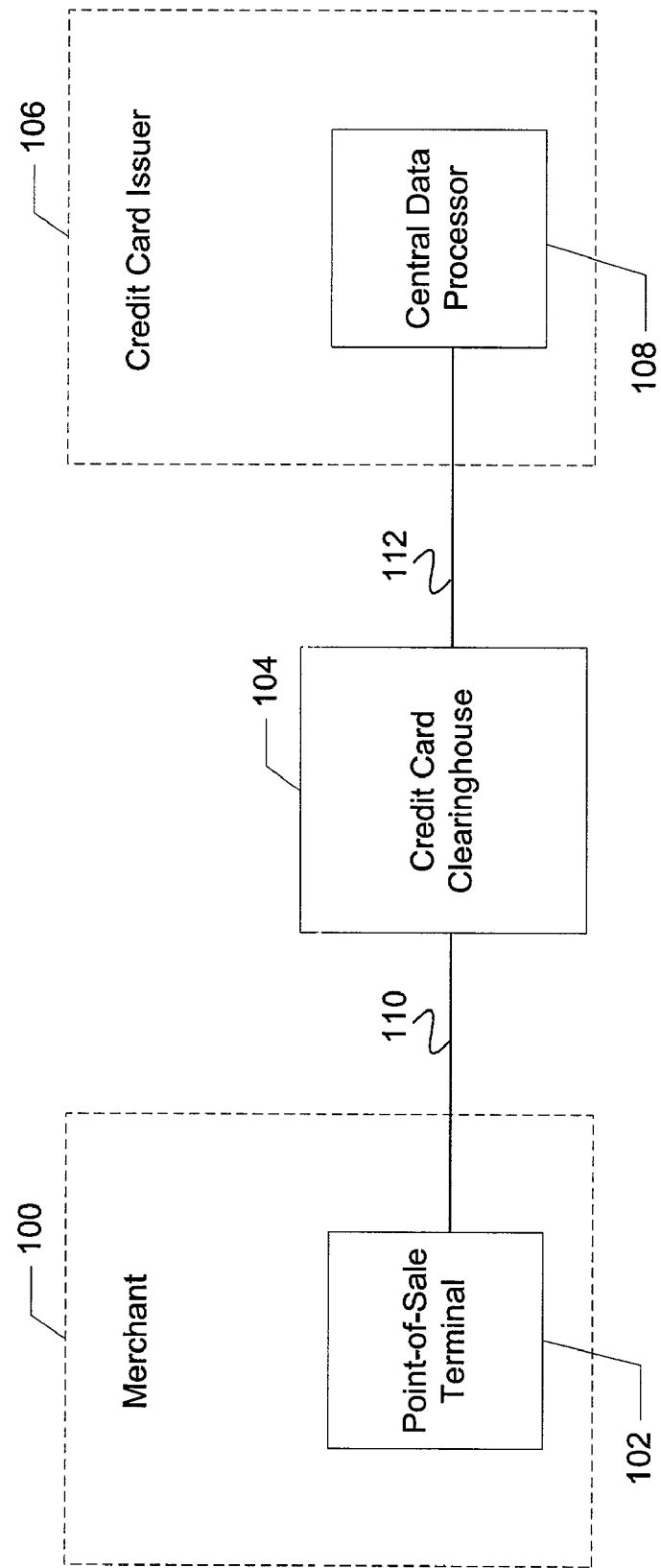
FIG. 1 is an illustration of an exemplary system environment according to the present invention.

FIG. 1 illustrates an exemplary system environment consistent with the present invention. A merchant 100 offers products (goods and/or services) to a plurality of customers. Merchant 100 uses a point-of-sale terminal 102 for processing purchase transactions between merchant 100 and a customer. Typically, the point-of-sale terminal 102 comprises a computerized cash register with a credit card swiping device (not shown).

Point-of-sale terminal 102 may be operatively connected to a credit card clearinghouse 104 by connection 110. Connection 110 may be any known wireless or wireline connection suitable for carrying electronic, voice, or other data. One skilled in the art will recognize that point-of-sale terminal 102 may also comprise a cash register having an associated swiping device or a cash register with no swiping device, so long as point-of-sale terminal can communicate, directly or indirectly, with clearinghouse 104. Where point-of-sale terminal 102 has no swiping device, connection 110 may comprise a telephone connection. For example, a merchant using a manual cash register may telephone clearinghouse 104 to obtain approval for a particular purchase transaction.

Credit card clearinghouse 104 redirects inquiries and approval requests from merchant 100 to any of a plurality of credit card issuers 106. Typically, clearinghouse 104 would redirect a request from merchant 100 to a credit card issuer 106 corresponding to the issuer of the account held by the cardholder transacting business with merchant 100. Clearinghouse 104 interfaces with a central data processor 108 at credit card issuer 106 over a connection 112. Connection 112 may be any known wireless or wireline connection suitable for carrying electronic, voice, or other data. Central data processor 108 includes program code (not shown) for implementing processes consistent with the present invention, which are described below with respect to FIGS. 2-4.

Figure 2:
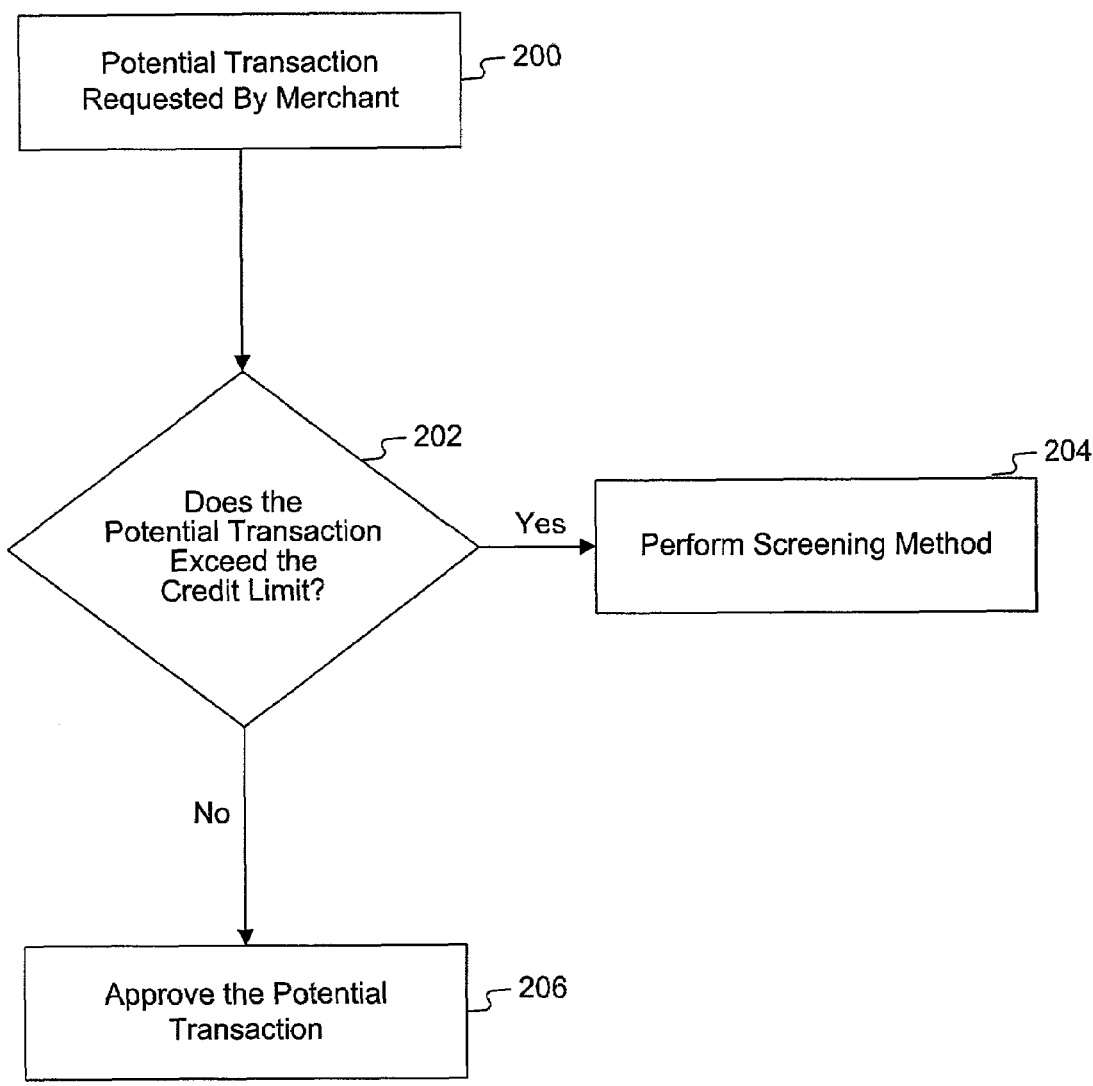
FIGS. 2-4 are flowcharts of transaction analysis methods consistent with the present invention.

Turning now to FIG. 2, a flowchart illustrates an exemplary method for characterizing a potential transaction. The potential transaction is requested by a merchant in step 200. The transaction may, for example, take the form of a credit card payment for goods or services offered by the merchant. Once the transaction is requested, a determination is made in step 202 as to whether the monetary value of the potential transaction plus the outstanding balance exceeds the credit limit. Further, in the case of a credit card account with no stated credit limit, step 202 may comprise a determination of whether the monetary value of the potential transaction plus the outstanding balance would exceed a balance bogey. If step 202 yields a negative determination ("NO"), the potential transaction is automatically approved in step 206. If step 202 yields an affirmative determination ("YES"), then the transaction is further analyzed to determine whether approval is proper (step 204). The analysis of step 204 may comprise a determination of whether to approve the potential transaction and/or whether to increase the credit limit of the credit card account. Further, the analysis of step 204 may comprise a determination of whether to increase the balance bogey of a credit card account with no stated credit limit. The analysis of step 204 will be described in greater detail below with reference to FIG. 3.

Figure 3:
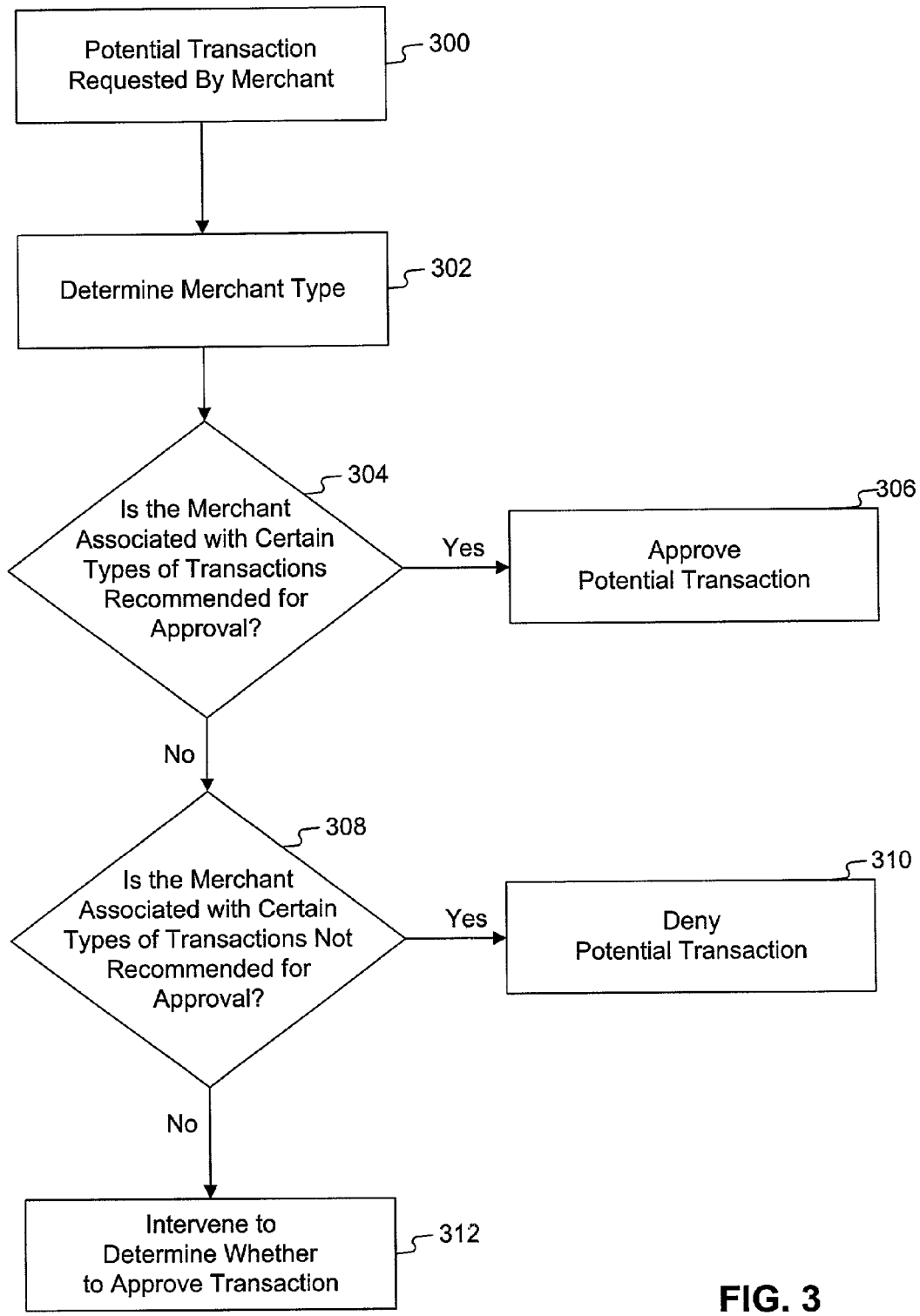

Turning now to FIG. 3, a flowchart is illustrated which presents a transaction analysis method consistent with the present invention. At step 300, a potential credit card transaction is requested by a merchant. As mentioned previously, the potential transaction may take the form of a customer using a credit card account to purchase products from the merchant. In such a case, the merchant sends an electronic message from point-of-sale terminal 102 to central data processor 108. The merchant sends this electronic message to determine whether central data processor 108 will indicate whether the transaction is approved. In step 302, central data processor 108 then determines a merchant type corresponding to the potential transaction. As used herein, "merchant type" refers to a predetermined code assigned to each merchant, such as the Merchant Category Codes known to those skilled in the art. Such codes may be determined, by either the credit card issuer or a third party, based, for example, on the industry or retail segment associated with a particular merchant. For instance, a restaurant may be accorded code 5812, a grocery store may be accorded code 5411, and an automated fuel dispenser may be accorded code 5542. Based on this code, the central data processor is able to discern a merchant type corresponding to the merchant of the potential transaction.

The method progresses to step 304, where a determination is made as to whether the merchant is associated with certain types of transactions which may be recommended for approval. Such transactions may be either low credit risk-type transactions or transactions for "bare necessities" (e.g., food, clothing, or shelter). In making this determination at step 304, factors which may be considered include:

Whether it would be a gross inconvenience to the cardholder to deny the type of transactions associated with the merchant;

Whether there is a relatively low risk of fraud associated the type of transactions associated with the merchant;

Whether the type of transactions associated with the merchant are typically of a low monetary value (for example, $200 or less); and Whether a referral of the transaction to a credit analyst is not particularly helpful (e.g., restaurant, grocery) or whether referral is impossible (e.g., gas pump).

For example, processor 108 may determine at stage 304 whether the merchant is a grocery store, a restaurant, or a fuel dispenser. If stage 304 yields an affirmative determination ("YES"), central data processor 108 automatically approves the potential transaction in step 306. If step 304 yields a negative determination ("NO"), a second determination is made at step 308.

In step 308, a determination is made as to whether the merchant is associated with certain types of transactions which may not be recommended for approval. Such transactions not recommended for approval may include, for example, high credit risk-type transactions, such as a mail order, a telephone order, or an Internet order transactions. The same factors enumerated above may be used to determine what kinds of transactions may not be recommended for approval. If stage 308 yields an affirmative determination ("YES"), the central data processor automatically denies the potential transaction in step 310. If step 308 yields a negative determination ("NO"), data processor 108 determines that further analysis is required to determine whether to approve the transaction in step 312. The further analysis of step 312 may involve, for example, heuristically analyzing the type of product associated with the purchase transaction, a telephone conversation between the merchant and a customer service representative of the card issuer, or a combination of both. This analysis will be described in greater detail below with reference to FIG. 4.

With regard to potential transactions which exceed a credit limit or balance bogey, the logic of the method of FIG. 3 is further described as follows. For potential transactions which involve merchants having a historically low occurrence of fraud and theft will be automatically approved. Similarly, the system will approve purchase transactions for bare necessities or other types of products that are associated with a low credit risk. On the other hand, transactions that are historically associated with a high occurrence of fraud and theft or with a high credit risk will be automatically denied.

Furthermore, other factors may be used to determine whether transactions associated with certain merchants should be approved. For example, the necessity of the product sold by the merchant and the inconvenience to the cardholder of denying a transaction for the product may be considered, as described above. Typical monetary values for transactions made at the merchant and telephone availability of the cardholder during the transaction may also be considered.

Figure 4:
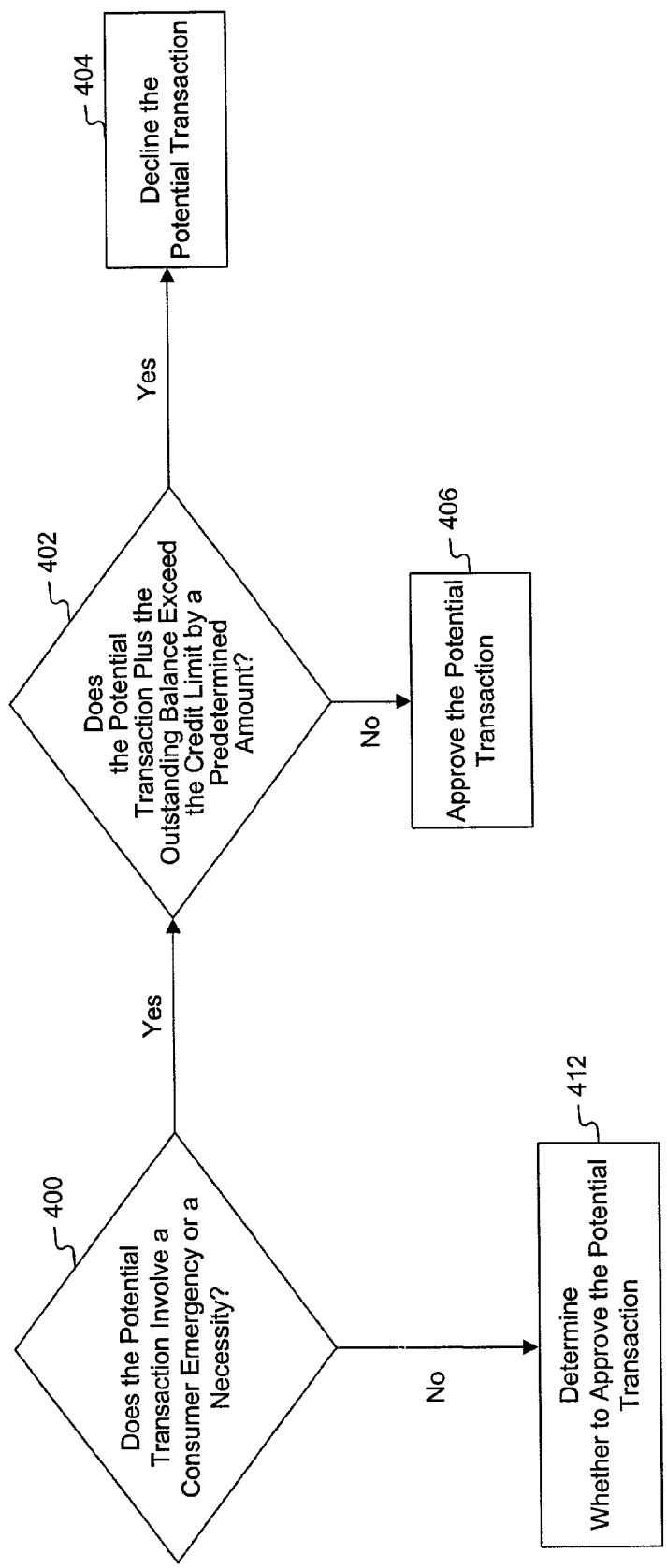

FIG. 4 is a flowchart of a transaction analysis method consistent with the present invention. In step 400 of FIG. 4, a determination is made as to whether a potential transaction is for products associated with consumer emergencies or necessities, such as transactions involving a hotel, a car rental, an overseas transaction, or an emergency. If step 400 yields an affirmative determination ("YES"), a second determination will be made in step 402. In step 402, the determination is made as to whether the potential transaction plus the account balance would exceed the credit limit by more than a predetermined amount. This amount may be, for example, either a fixed monetary amount or a predetermined percentage of the credit limit associated with the account (e.g., 5%, 10%, 20%, or 40%). Further, in an account with no stated credit limit, step 402 may comprise determining whether the potential transaction plus the outstanding balance exceeded the balance bogey by more than a predetermined amount. If step 402 yields an affirmative determination ("YES") the potential transaction is declined in step 404. If step 402 yields a negative determination ("NO"), the potential transaction is approved in step 406.

The logic behind steps 400, 402, 404, and 406 is that potential transactions that are for emergencies or otherwise involve necessities are generally approved. For example, overseas transactions may warrant more lenient approval because the potential inconvenience to a cardholder may be great, especially when considering potential time or language barriers associated with not approving the transaction. However, an approval for these types of transactions may not exceed more than a predetermined amount over the credit limit or balance bogey.

When step 400 yields a negative determination ("NO"), another determination is made in step 412. This may relate to situations where the potential transactions are not for emergencies and do not deal with necessities. In step 412, a determination is made whether to approve the potential transaction. Potential transactions which would exceed the balance bogey or the credit limit and which are not emergent or necessary may, for example, require the approval and intervention of a credit analyst. In this way, the credit analyst may determine whether to approve the potential transaction (step 412) based on the considerations described above with respect to FIGS. 3 and 4.

To implement the methods of FIGS. 3 and 4, central data processor 108 may include a table (not shown) that correlates predetermined types of merchants and products with a particular credit risk. For instance, the table may correlate predetermined types of merchant codes with either a low credit risk or a high credit risk. The table may similarly correlate credit risk with types of products. Alternatively, the table may define a standard credit risk associated with each merchant or product. Processor 108 may then adjust the standard credit risk based on predetermined criteria associated with the particular transaction, such as the following criteria: (1) the time of day the transaction is requested and/or made; (2) the medium in which the customer is making the transaction, such as over the Internet or at a typical bricks-and-mortar store; and/or (3) the credit history of the customer making the transaction. Each of these criteria may define how risky the transaction is from the standpoint of the account issuer. For example, a transaction made in the middle of the night, over the Internet, by a customer having a low credit rating, may indicate that the standard credit risk associated with that transaction should be scaled to a higher credit risk. Processor 108 then compares this scaled credit risk with a threshold value to determine whether to approve the transaction (e.g., as described above with respect to steps 304, 308, or 400). Other ways for determining whether to approve the particular transaction may also be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing a financial transaction associated with a financial account, wherein the transaction would cause an outstanding balance of the financial account to exceed a credit limit, the method comprising:

determining a merchant type for a merchant which is a party to the transaction;

determining a merchant credit risk associated with the determined merchant type;

determining a type of product associated with the transaction;

determining a credit risk associated with the transaction based on the determined type of product associated with the transaction, wherein the determining the credit risk associated with the transaction includes:

determining whether the product is associated with at least one of a consumer emergency and a consumer necessity, and allocating a low credit risk to the product when the product is determined to be associated with at least one of a consumer emergency and a consumer necessity;

comparing the merchant credit risk to a threshold value defining an acceptable credit risk;

comparing the product credit risk associated with the threshold value; and approving the transaction based on the comparison of the merchant credit risk with the threshold value and based the comparison of the determined product credit risk with the threshold value.

2. A computer for managing a financial transaction associated with a financial account, wherein the transaction would cause an outstanding balance of the financial account to exceed a credit limit, the computer comprising:

a memory having programming instructions; and a processor, responsive to the programming instructions, configured to:

determine a merchant type for a merchant which is a party to the transaction;

determine a merchant credit risk associated with the determined merchant type;

determine a type of product associated with the transaction;

determine a credit risk associated with the transaction based on the determined type of product associated with the transaction by determining whether the product is associated with at least one of a consumer emergency and a consumer necessity, and allocating a low credit risk to the product when the product is determined to be associated with at least one of a consumer emergency and a consumer necessity;

compare the merchant credit risk to a threshold value defining an acceptable credit risk;

compare the product credit risk associated with the threshold value; and approve the transaction based on the comparison of the merchant credit risk with the threshold value and based the comparison of the determined product credit risk with the threshold value.

3. A system for managing a financial transaction associated with a financial account, wherein the transaction would cause an outstanding balance of the financial account to exceed a credit limit, the system comprising:

means for determining a merchant type for a merchant which is a party to the transaction;

means for determining a merchant credit risk associated with the determined merchant type;

means for determining a type of product associated with the transaction;

means for determining a credit risk associated with the transaction based on the determined type of product associated with the transaction, wherein the means for determining a credit risk includes:

means for determining whether the product is associated with at least one of a consumer emergency and a consumer necessity, and means for allocating a low credit risk to the product when the product is determined to be associated with at least one of a consumer emergency and a consumer necessity;

means for comparing the merchant credit risk to a threshold value defining an acceptable credit risk;

means for comparing the product credit risk associated with the threshold value; and means for approving the transaction based on the comparison of the merchant credit risk with the threshold value and based the comparison of the determined product credit risk with the threshold value.

4. A method for managing a financial transaction associated with a financial account, wherein the transaction would cause an outstanding balance of the financial account to exceed a credit limit, the method comprising:

determining a type of product associated with the transaction;

determining a credit risk associated with the transaction based on the determined type of product associated with the transaction, wherein determining the credit risk associated with the transaction further comprises:

determining whether the product is associated with at least one of a consumer emergency and a consumer necessity, and allocating a low credit risk to the product when the product is determined to be associated with at least one of a consumer emergency and a consumer necessity;

comparing the product credit risk associated with the threshold value; and approving the transaction based the comparison of the determined product credit risk with the threshold value.

5. A computer for managing a financial transaction associated with a financial account, wherein the transaction would cause an outstanding balance of the financial account to exceed a credit limit, the computer comprising:

a memory having programming instructions; and a processor, responsive to the programming instructions, configured to:

determine a type of product associated with the transaction;

determine a credit risk associated with the transaction based on the determined type of product associated with the transaction by determining whether the product is associated with at least one of a consumer emergency and a consumer necessity and allocating a low credit risk to the product when the product is determined to be associated with at least one of a consumer emergency and a consumer necessity;

compare the product credit risk associated with the threshold value; and approve the transaction based the comparison of the determined product credit risk with the threshold value.

6. An system for managing a financial transaction associated with a financial account, wherein the transaction would cause an outstanding balance of the financial account to exceed a credit limit, the system comprising:

means for determining a type of product associated with the transaction;

means for determining a credit risk associated with the transaction based on the determined type of product associated with the transaction, wherein the means for determining the credit risk associated with the transaction further comprises:

means for determining whether the product is associated with at least one of a consumer emergency and a consumer necessity, and means for allocating a low credit risk to the product when the product is determined to be associated with at least one of a consumer emergency and a consumer necessity;

means for comparing the product credit risk associated with the threshold value; and means for approving the transaction based the comparison of the determined product credit risk with the threshold value.

\* \* \* \* \*